(12) United States Patent
Kawamoto et al.

(10) Patent No.: US 6,654,081 B2
(45) Date of Patent: Nov. 25, 2003

(54) OPTIC ELEMENT, ILLUMINATION DEVICE AND/OR LIQUID-CRYSTAL DISPLAY DEVICE

(75) Inventors: Ikuo Kawamoto, Ibaraki (JP); Hironori Motomura, Ibaraki (JP); Naoki Takahashi, Ibaraki (JP)

(73) Assignee: Nitto Denko Corporation, Ibaraki (JP)

( * ) Notice: Subject to any disclaimer, the term of this patent is extended or adjusted under 35 U.S.C. 154(b) by 0 days.

(21) Appl. No.: 10/067,994

(22) Filed: Feb. 8, 2002

(65) Prior Publication Data

US 2003/0151704 A1 Aug. 14, 2003

(51) Int. Cl.$^7$ ............................................. G02F 11/3357
(52) U.S. Cl. ........................... 349/96; 349/98; 349/115; 349/117; 349/65; 349/176
(58) Field of Search ....................... 349/65, 96, 98, 349/117, 115, 122, 176, 57; 359/494, 490, 487, 500; 362/19, 26, 31

(56) References Cited

U.S. PATENT DOCUMENTS

| | | | |
|---|---|---|---|
| 6,099,758 A | * | 8/2000 | Verrall et al. ............... 252/585 |
| 6,217,955 B1 | * | 4/2001 | Coates et al. ............... 428/1.31 |
| 6,433,853 B1 | * | 8/2002 | Kameyama et al. ........ 349/176 |
| 2001/0022997 A1 | * | 9/2001 | Honda et al. ............... 428/1.31 |
| 2001/0033349 A1 | * | 10/2001 | Honda et al. ............... 349/96 |

FOREIGN PATENT DOCUMENTS

| | | |
|---|---|---|
| JP | 4-268505 | 9/1992 |
| JP | 10-319235 | 12/1998 |
| JP | 11-311710 | 11/1999 |
| WO | WO 95/17691 | 6/1995 |

\* cited by examiner

*Primary Examiner*—Toan Ton
*Assistant Examiner*—Tai Duong
(74) *Attorney, Agent, or Firm*—Armstrong, Westerman & Hattori, LLP

(57) ABSTRACT

There is provided an optical element having: a laminate including a reflective type polarizer for separating incident light into polarized light components through reflection and transmission, and a dichromatic polarizer, wherein a variation of hue between two points calculated by the expression: $\sqrt{\{(x2-x1)^2+(y2-y1)^2\}}$ is not larger than 0.06 when x1 and y1 express a hue at a point with a predetermined elevation angle and any azimuth angle, and x2 and y2 express a hue at another point with the same elevation angle and a changed azimuth angle in the case where transmitted light is obliquely viewed in the condition that the laminate is disposed on a planar light source so that the reflective type polarizer is located in an inner side. An illuminator having the above planar light source and laminate and including a reflection layers on its rear surface side, is disposed behind a liquid crystal cell.

19 Claims, 2 Drawing Sheets

OPTIC ELEMENT, ILLUMINATION DEVICE AND/OR LIQUID-CRYSTAL DISPLAY DEVICE

The present application is based on Japanese Patent Application No. 2000-337729, which is incorporated herein by reference.

BACKGROUND OF THE INVENTION

1. Field of the Invention

The present invention relates to an optical element for use in forming a liquid-crystal display device in which hue is changeless in spite of an azimuth angle changed at oblique viewing, and an illuminator using the optical element.

2. Description of the Related Art

A group to which the present inventors belong has already proposed an optical element having a function of separating incident light into polarized light components through reflection and transmission, wherein variation in transmittance and hue from in-plane averages ranges from 0.5 to 5.0 in terms of $\Delta E$ given by the Hunter's color difference formula: $\Delta E = \sqrt{(\Delta L^2 + \Delta a^2 + \Delta b^2)}$ (in which L is a lightness index, and a and b are chromaticness indices) and wherein the optical element may be constituted by a laminate of a reflective type polarizer provided with a quarter-wave plate and a dichromatic polarizer as occasion demands (Unexamined Japanese Patent Publication No. Hei. 11-311710). This proposal was aimed at applying an optical element satisfying $\Delta E$ to a liquid-crystal display device to attain improvement of luminance and prevention of display unevenness. There was, however, a disadvantage in that hue varied largely in accordance with the azimuth angle changed at oblique viewing though good display could be obtained at frontal viewing.

There has been another proposal for a liquid-crystal display device in which variation of chromaticity between hue at frontal viewing and hue at oblique viewing is suppressed (Unexamined Japanese Patent Publication No. Hei. 10-319235). This proposal cannot cope with variation of hue in accordance with the azimuth angle changed at oblique viewing. Even if chromaticity at an oblique viewing point having an azimuth angle of 0 or 45 degrees and an elevation angle of 70 degrees could be suppressed to 0.04 which is a value equal to that at a frontal viewing point, the chromaticity changes by 0.08 and the hue varies largely in accordance with the azimuth angle changed from 0 to 45 degrees when both the chromaticity coordinates x, y change in a plus direction in the case of an azimuth angle of 0 but change in a minus direction in the case of an azimuth angle of 45 degrees. Accordingly, this measure cannot sufficiently cope with variation of hue in accordance with the azimuth angle changed at oblique viewing when the direction of coloring turns over between plus and minus directions in accordance with the azimuth angle at oblique viewing.

SUMMARY OF THE INVENTION

An object of the invention is to develop an optical element for use in forming a liquid-crystal display device in which hue is changeless in spite of the azimuth angle changed at oblique viewing, and an illuminator using the optical element.

According to the invention, there is provided an optical element having: a laminate including a reflective type polarizer for separating incident light into polarized light components through reflection and transmission, and a dichromatic polarizer, wherein a variation of hue between two points calculated by the expression: $\sqrt{(x2-x1)^2+(y2-y1)^2}$ is not larger than 0.06 when x1 and y1 express a hue at a point with a predetermined elevation angle and any azimuth angle, and x2 and y2 express a hue at another point with the same elevation angle and a changed azimuth angle in the case where transmitted light is obliquely viewed in the condition that the laminate is disposed on a planar light source so that the reflective type polarizer is located in an inner side. There is further provided an illuminator having a planar light source including a reflection layer on its rear surface side, and an optical element defined above and disposed on the front surface side of the planar light source so that the reflective type polarizer of the optical element is located in an inner side. In addition, there is provided a liquid-crystal display device having an illuminator defined above, and a liquid-crystal cell disposed on a light exit side of the illuminator.

The optical element or illuminator according to the invention can be used for forming a liquid-crystal display device in which hue is changeless in spite of the azimuth angle changed at oblique viewing. Hence, a liquid-crystal display device good in display quality and having a large-scale screen can be formed advantageously.

DETAILED DESCRIPTION OF THE PREFERRED EMBODIMENTS

An optical element according to the invention has: a laminate including a reflective type polarizer for separating incident light into polarized light components through reflection and transmission, and a dichromatic polarizer, wherein a variation of hue between two points calculated by the expression: $\sqrt{(x2-x1)^2+(y2-y1)^2}$ is not larger than 0.06 when x1 and y1 express a hue at a point with a predetermined elevation angle and any azimuth angle, and x2 and y2 express a hue at another point with the same elevation angle and a changed azimuth angle in the case where transmitted light is obliquely viewed in the condition that the laminate is disposed on a planar light source so that the reflective type polarizer is located in an inner side.

Figure 1:
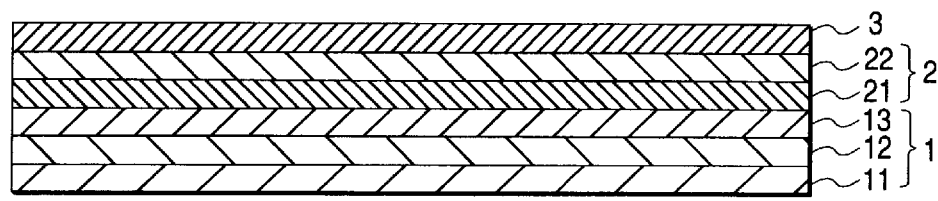
FIG. 1 is a sectional view showing an example of an optical element.

FIG. 1 shows an example of the optical element. The optical element has at least a reflective type polarizer 1 for separating incident light into polarized light components through reflection and transmission, and a dichromatic polarizer 3 laminated on the reflective type polarizer 1. In the example shown in FIG. 1, the reflective type polarizer 1 has a support base material 11, and two cholesteric liquid-crystal layers 12 and 13 superposed on the support base material 11, that is, the reflective type polarizer 1 is formed as a circularly polarized light separating layer. A quarter-wave plate 2 is provided on the circularly polarized light separating layer 1. The quarter-wave plate 2 has two retardation layers 21 and 22. Also, a dichromatic polarizer 3 is laminated on the quarter-wave plate 2.

The reflective type polarizer is provided for supplying polarized light to the dichromatic polarizer to suppress absorption loss to improve light-utilizing efficiency to thereby improve luminance of a liquid-crystal display device. The reflective type polarizer may be made of a suitable material exhibiting a function of separating incident light such as natural light into polarized light components through reflection and transmission. Examples of the suitable material include: a linearly polarized light separating element made of a multilayer thin film and capable of transmitting a linearly polarized light component with a predetermined axis of polarization but reflecting the other light component as described in Unexamined Japanese Patent Publication No. 4-268505 and WO 95/17691; and an oriented layer of cholesteric liquid crystal.

The oriented layer of cholesteric liquid crystal can be used for obtaining a circularly polarized light separating layer capable of separating natural light into left- and right-handed circularly polarized light components through reflection and transmission. Cholesteric liquid crystal exhibits a function of separating light into circularly polarized light components different in wavelength characteristic on the basis of the difference between helical pitches in the Grandjean orientation. In the invention, the reflective type polarizer may be provided as a circularly polarized light separating layer having a suitable layer structure such as a single layer structure or a multilayer structure.

Examples of the layer structure include: a circularly polarized light separating layer constituted by a single layer or a plurality of layers in which the helical pitch changes in the thicknesswise direction; a circularly polarized light separating layer constituted by a superposition of two or more cholesteric liquid-crystal layers different in the center wavelength of the reflected light component as shown in FIG. 1; and a circularly polarized light separating layer formed by a combination of these two kinds of layer structures in which two or more cholesteric liquid-crystal layers different in helical pitch are superposed in order of size in terms of the center wavelength of the reflected light component so that the helical pitch as a whole changes in the thicknesswise direction.

The superposition of two or more cholesteric liquid-crystal layers different in the change of the helical pitch in the thicknesswise direction and the center wavelength of reflected light, that is, different in helical pitch, is performed for the purpose of widening the wavelength range permitting the separating function to act. That is, in a cholesteric liquid-crystal layer constituted by a single layer oriented in a fixed direction, the wavelength range exhibiting selective reflection (circular dichroism) is generally limited. Although the limited wavelength range may amount to a wide range such as an about 100 nm-wide wavelength range, such a wide wavelength range still cannot cover the whole of a visible light range required for application to a liquid-crystal display device. Therefore, the superposition of the cholesteric liquid-crystal layers is performed for enlarging the range of the change of the helical pitch to thereby enlarge the wavelength range exhibiting circular dichroism.

Incidentally, when several kinds of cholesteric liquid-crystal layers different in helical pitch but capable of reflecting circularly polarized light handed in the same direction with a selective reflection center wavelength in a range of from 300 to 900 nm are used in combination so as to be superposed on one another, a circularly polarized light separating layer which can cover a visible light range can be formed efficiently. Incidentally, the superposition of a combination of cholesteric liquid-crystal layers capable of reflecting circularly polarized light handed in the same direction is performed so that the retardation states of circularly polarized light reflected from the layers respectively are made uniform to eliminate the difference in the state of polarization in accordance with the wavelength range to thereby increase the quantity of polarized light allowed to be used.

In the circularly polarized light separating layer, the superposition of cholesteric liquid-crystal layers in order of size in terms of the center wavelength of the reflected light component is performed for suppressing the color change of the transmitted light component in accordance with the change of the view angle. On this occasion, a layer structure containing two or more cholesteric liquid-crystal layers equal in helical pitch can be allowed as represented by a structure in which one cholesteric liquid-crystal layer is interposed or two or more cholesteric liquid-crystal layers different in helical pitch are interposed between cholestric liquid-crystal layers equal in helical pitch in order of size in terms of the center wavelength.

Although low-molecular weight cholesteric liquid crystal can be used for forming the circularly polarized light separating layer, a cholestric liquid-crystal polymer may be used preferably from the point of view of handling property and thin film characteristic of the reflective type polarizer obtained. On this occasion, the reflective type polarizer maybe obtained as a single-layer structure constituted by a cholesteric liquid-crystal polymer film or as a multilayer structure constituted by a combination of aplastic film and a cholesteric liquid-crystal polymer film supported by the plastic film. From the point of view of widening the viewing angle to obtain good visibility of a liquid-crystal display device, there is preferably used a circularly polarized light separating layer made of a cholesteric liquid-crystal polymer oriented in the Grandjean texture in a faultless state of domain.

Incidentally, any suitable polymer may be used as the cholesteric liquid-crystal polymer without any particular limitation. Hence, there may be used various polymers such as main chain type or side chain type polymers in which conjugate linear atom groups (mesogen) for providing liquid-crystal orienting characteristic are introduced in main or side chains of the polymers. A cholesteric liquid-crystal polymer with a large index difference in birefringence maybe used preferably. This is because the selective reflection wavelength range becomes wider as the index difference in birefringence of the cholesteric liquid-crystal polymer increases so that the number of layers can be reduced and margin for wavelength shifting at a wide viewing angle can be allowed. Incidentally, from the point of view of handling property and stability of orientation at practical temperature, a polymer with a glass transition temperature of from 30 to 150° C. is preferably used as the liquid-crystal polymer.

For example, a polymer having a structure in which mesogen groups made of a para-substitutional cyclic compound are bonded, if necessary, through a spacer portion for providing flexing characteristic can be used as the main chain type liquid-crystal polymer. Specific examples of the main-chain type liquid-crystal polymer include a polyester polymer, a polyamide polymer, a polycarbonate polymer, and a polyester-imide polymer.

For example, as the side chain type liquid-crystal polymer, there can be used a polymer having a low-molecular liquid-crystal compound (mesogen portion) made of a para-substitutional cyclic compound containing polyacrylate, polymethacrylate, polysiloxane, polymalonate or the like as the skeleton of a main chain, if necessary, through a spacer portion constituted by conjugate atom groups as a side chain. Specific examples of the side chain type liquid-crystal polymer include a nematic liquid-crystal polymer containing a low-molecular chiral agent, a liquid-crystal polymer containing a chiral component introduced therein, and a mixture of a nematic liquid-crystal polymer and a cholesteric liquid-crystal polymer.

Also in the liquid-crystal polymer containing a para-substitutional cyclic compound having para-substitutional aromatic units or para-substitutional cyclohexyl ring units such as an azome methine form, an azo form, an azoxy form, an ester form, a biphenyl form, a phenylcyclohexane form or a bicyclohexane form for providing nematic orientation characteristic as described above, cholesteric orientation characteristic can be obtained by a method of introducing a suitable chiral component made of an asymmetric carbon atom-containing compound or a low-molecular chiral agent into the polymer (Unexamined Japanese Patent Publication No. Sho. 55-21479, U.S. Pat. No. 5,332,522, and so on). Incidentally, the terminal substituent group in para position of the para-substitutional cyclic compound may be a suitable group such as a cyano group, an alkyl group or an alkoxy group.

Examples of the spacer portion include chains exhibiting flexing characteristic, such as a polymethylene chain —$(CH_2)_n$—and a polyoxymethylene chain —$(CH_2CH_2O)_m$—. The number of iterations of the structural unit for forming the spacer portion can be determined suitably in accordance with the chemical structure of the mesogen portion. Generally, the number n of iterations in the case of a polymethylene chain is selected to be in a range of from 0 to 20, especially in a range of from 2 to 12, and the number m of iterations in the case of a polyoxymethylene chain is selected to be in a range of from 0 to 10, especially in a range of from 1 to 3.

The circularly polarized light separating layer constituted by a cholesteric liquid-crystal polymer can be formed by a method in accordance with the related-art process of orienting low-molecular liquid crystal. Incidentally, an example of the method is a method including the steps of: spreading a liquid-crystal polymer on a suitable oriented film such as an oriented film prepared by forming a film of polyimide, polyvinyl alcohol, polyester, polyallylate, polyamide-imide, or polyether-imide, on a support base material and rubbing the film with a rayon fabric, an obliquely vapor deposited layer of $SiO_2$, or an oriented film subjected to a drawing process; heating the liquid-crystal polymer at a temperature not lower than the glass transition temperature but lower than the isotropic phase transition temperature; and cooling the liquid-crystal polymer to a temperature lower than the glass transition temperature in a state of molecules of the liquid-crystal polymer oriented in the Grandjean texture to thereby make the liquid-crystal polymer in a glass state to form a solidified layer having the orientation fixed.

A suitable material such as a single- or laminated-layer or drawn film of plastics, or a glass plate may be used as the support base material. Examples of the plastics include triacetyl cellulose, polyvinyl alcohol, polyimide, polallylate, polyester, polycarbonate, polysulfone, polyether-sulfone, amorphous polyolefin, denatured acrylic polymer, and epoxy resin. A plastic film is preferred from the point of view of reduction in thickness.

For example, the spreading of the liquid-crystal polymer can be performed by a method including the steps of: spreading a solution of the liquid-crystal polymer dissolved in a solvent into a thin layer by a suitable method such as a spin coating method, a roll coating method, a flow coating method, a printing method, a dip coating method, a cast coating method, a bar coating method or a gravure printing method; and drying the solution as occasion demands. A suitable solvent such as methylene chloride, cyclohexanone, trichloroethylene, tetrachloroethane, N-methylpyrolidone or tetrahydrofuran may be used as the solvent.

Alternatively, the liquid-crystal polymer may be spread by a method using no solvent, that is, by a method beneficial to sanitation in a working environment. For example, the method using no solvent has the steps of: spreading a hot melt of a liquid-crystal polymer, especially, a hot melt exhibiting isotropic phase, in the same manner as described above; and spreading the hot melt into a thin layer while retaining the melt temperature in accordance with necessity to thereby solidify the hot melt.

The heating process for orienting the spread layer of the liquid-crystal polymer can be performed by heating the liquid-crystal polymer in a temperature range of from the glass transition temperature to the isotropic phase transition temperature of the liquid-crystal polymer as described above, that is, in a temperature range in which the liquid-crystal polymer exhibits a liquid-crystal phase. Further, the fixation of the oriented state can be performed by cooling the liquid-crystal polymer to a temperature lower than the glass transition temperature. The condition for cooling is not particularly limited. A naturally cooling method is generally employed because the heating process can be generally performed at a temperature not higher than 300° C. Incidentally, various additives such as a stabilizer, a plasticizer, and metals can be mixed with the spread solution of the cholesteric liquid-crystal polymer as occasion demands.

The preferred thickness of the solidified liquid-crystal polymer layer formed on the support base material is in a range of from 0.5 to 50 $\mu$m, especially in a range of from 1 to 30 $\mu$m, further especially in a range of from 2 to 10 $\mu$m, from the point of view of preventing both disorder of orientation and lowering of transmittance and widening the wavelength range for selective reflection. The solidified liquid-crystal polymer layer on the support base material may be integrated with the support base material or may be used in the form of a film separated from the support base material. Incidentally, when the solidified liquid-crystal polymer layer is integrated with the support base material, the preferred total thickness of the layer inclusive of the base material is in a range of from 2 to 500 $\mu$m, especially in a range of from 5 to 300 $\mu$m, further especially in a range of from 10 to 200 $\mu$m.

The production of the circularly polarized light separating layer with its helical pitch varying in a direction of the thickness thereof can be performed, for example, by an operation of bonding a predetermined number, two or three or more, of oriented cholesteric liquid-crystal polymer layers to one another by hot pressing. A suitable method such as a method of heating the cholesteric liquid-crystal polymer layers to a temperature not lower than the glass transition temperature but lower than the isotropic phase transition temperature through a suitable hot pressing unit such as a roll laminator to thereby contact-bond the cholesteric liquid-crystal polymer layers to one another can be employed for the hot pressing process. In the case of the solidified liquid-crystal polymer layers integrated with the support base material, the circularly polarized light separating layer with its helical pitch varying in a direction of the thickness thereof can be obtained by superposing the solidified layers on one another as described above so that the solidified layers come into contact with each other.

Incidentally, the circularly polarized light separating layer having its helical pitch varying in a direction of the thickness thereof may be a layer exhibiting a continuous wavelength range of reflected light or maybe a layer exhibiting a discontinuous wavelength range of reflected light. The circularly polarized light separating layer preferred from the point of view of prevention of color unevenness is a layer exhibiting a continuous wavelength range of reflected light. For example, such a circularly polarizing light separating layer can be produced by a method in which a superposed body of cholesteric liquid-crystal polymer layers formed by the hot pressing operation is heated at a temperature not lower than the glass transition temperature but lower than the isotropic phase transition temperature to thereby form a mixed layer of cholesteric liquid-crystal polymers forming upper and lower layers in a contact interface therebetween.

In the above description, the cholesteric liquid-crystal polymer layer formed by mixing cholesteric liquid-crystal polymers of the upper and lower layers forms a circularly polarized light separating layer with its helical pitch which is different from those of the upper and lower layers and which varies multistageously in a direction of the thickness thereof. Generally, the helical pitch of the circularly polarized light separating layer takes one of intermediate values between those of the cholesteric liquid-crystal polymer layers forming the upper and lower layers, so that the circularly polarized light separating layer together with the upper and lower layers forms a region exhibiting a continuous wavelength range of reflected light. Accordingly, when cholesteric liquid-crystal polymer layers are used in combination so that the wavelength ranges of reflected light in the upper and lower layers do not overlap each other, that is, when cholesteric liquid-crystal polymer layers are used in combination so that a missing region due to discontinuity is present in a total wavelength range of reflected light, the cholesteric liquid-crystal polymer layer formed by mixing the upper and lower layers can compensate for the missing region to make the wavelength range of reflected light continuous.

Hence, for example, a circularly polarized light separating layer capable of reflecting light in a wavelength range of from 500 to 600 nm, which is a discontinuous wavelength range of reflected light, can be obtained by use of two kinds of cholesteric liquid-crystal polymer layers exhibiting a reflected light wavelength range of not larger than 500 nm and a reflected light wavelength range of not smaller than 600 nm respectively. This arrangement means that a circularly polarized light separating layer exhibiting a wide-band reflected light wavelength range can be formed by superposition of a smaller number of cholesteric liquid-crystal polymer layers.

The reflective type polarizer, especially the reflective type polarizer having the circularly polarized light separating layer, may be used in combination with a quarter-wave plate having at least one retardation layer and added to at least one surface of the reflective type polarizer as shown in FIG. 1. The quarter-wave plate shown in FIG. 1 is provided for linearly polarizing circularly polarized light transmitted through the circularly polarized light separating layer. The quarter-wave plate may be disposed on either short wave side or long wave side of the circularly polarized light separating layer. In the case of a visible light range, a quarter-wave plate with a frontal retardation of 100 to 180 nm is preferably used as the quarter-wave plate (retardation layer) from the point of view of the linearly polarizing effect, and compensation for the color change caused by obliquely transmitted light. That is, the quarter-wave plate preferably used satisfies the formula: $(nx-ny)d=\Delta nd=100$ to 180 nm when nx is the maximum in-plane refractive index of the quarter-wave plate, ny is the refractive index of the quarter-wave plate in a direction perpendicular thereto, nz is the refractive index in a direction of the thickness of the quarter-wave plate, and d is the thickness of the quarter-wave plate.

The retardation layer, which may be used, as occasion demands, together with the retardation layer exhibiting the function of the quarter-wave plate, is provided for compensation. Accordingly, the color balance of light obliquely transmitted through the retardation layer exhibiting the quarter-wave plate function is made as coincident with the color balance of light perpendicularly transmitted through the retardation layer as possible so that neutral colors less colored unnaturally can be viewed through the polarizer. A retardation layer with a frontal retardation ($\Delta nd$) of 100 to 720 nm is preferably used. The retardation layer preferred from the point of view of compensation for the color change is a layer having a larger refractive index in a direction of the thickness thereof than that in one direction or those in both directions in the plane thereof or a layer in which Nz defined by the formula: $(nx-nz)/(nx-ny)$ is not larger than 5, especially not larger than 2, further especially not larger than 1.1 (each permitting minus values).

The retardation layer can be made of any material at option. A material excellent in transparency and especially exhibiting light transmittance of not lower than 80% to donate a uniform retardation is preferred. Examples of the material used generally include drawn films of plastics, and liquid-crystal polymers. Especially, liquid-crystal polymers oriented twistedly are used preferably. Incidentally, examples of the plastics include: polycarbonate; polyester; polysulfone; polyether-sulfone; polystyrene; polyolefins such as polyethylene and polypropylene; polyvinyl alcohol; cellulose acetate polymer; polyvinyl chloride; polyvinylidene chloride; polyallylate; polymethyl methacrylate; and polyamide.

The retardation layer having a large refractive index in a direction of the thickness thereof can be formed by a suitable method. An example of the suitable method is a method in which a film made of the polymer described above, or the like, by a suitable method such as a casting method or an extrusion method is heated and drawn by a uniaxial or biaxial method while the film is bonded to a heat-shrinkable film. The characteristic such as $\Delta nd$ and $Nz$ of the retardation layer can be controlled by changing the conditions for the material and thickness of the film, the magnification of drawing, and the temperature for drawing. The general thickness of the retardation layer is in a range of from 10 to 500 $\mu$m, especially in a range of from 20 to 200 $\mu$m in terms of the thickness of a single layer. However, the thickness is not limited thereto.

Incidentally, when the retardation layer such as a quarter-wave plate is made of a liquid-crystal polymer, the retardation layer can be obtained as a layer having a suitable form such as an oriented film of a liquid-crystal polymer or an oriented layer of a liquid-crystal polymer supported by a transparent base material, as listed above in the description of the circularly polarized light separating layer. When a liquid-crystal polymer is used, the aimed retardation layer can be formed without being subjected to any drawing process.

The quarter-wave plate may be constituted by a single retardation layer or may be constituted by a superposed body of two retardation layers or of three or more retardation layers different in retardation, as described above. The superposition of such retardation layers different in retardation is effective in widening the wavelength range permitting the superposed body to function as an aimed quarter-wave plate or an aimed compensating plate. When a superposed body of retardation layers is used, it is preferable from this point of view that one retardation layer having a higher refractive index in a direction of the thickness thereof than at least one of in-plane refractive indices is disposed, or two or more retardation layers having higher refractive indices in a direction of the thickness thereof than at least one of in-plane refractive indices are disposed.

The reflective type polarizer preferred from the point of view of the luminance improving effect is a plate capable of transmitting a linearly polarized light component with a predetermined axis of polarization and reflecting the other light component. As shown in FIG. 1, the optical element is formed so that the dichromatic polarizer 3 is disposed on the quarter-wave plate 2 when the reflective type polarizer 1 is provided with the quarter-wave plate 2. Such an optical element may be directly applied to a liquid-crystal cell without separate provision of any dichromatic polarizer because the dichromatic polarizer of the optical element functions as a polarizing element. Incidentally, the circularly or linearly polarized light separating layer used is preferably configured so that precision of thickness and uniformity of the orientation state in accordance with the temperature for orientation or drawing are controlled with high accuracy. The quarter-wave plate is also preferably configured so that variation in retardation is suppressed with high accuracy.

A suitable material such as an absorptive type polarizing film or polyene-oriented film impregnated with a dichromatic substance, or the film coated with a transparent protective layer, may be used as the dichromatic polarizer. Incidentally, an example of the absorptive type polarizing film is a film formed by adsorbing iodine or a dichromatic substance such as dichromatic dye onto a hydrophilic polymer film such as a polyvinyl alcohol film, a partially formalized polyvinyl alcohol film or a partially saponified ethylene-vinyl acetate copolymer film and drawing the hydrophilic polymer film. Examples of the polyene-oriented film include a dehydrated polyvinyl alcohol film, and dehydrochlorinated polyvinyl chloride film. Incidentally, the thickness of the dichromatic polarizing film is generally in a range of from 5 to 80 $\mu$m but is not limited to the range.

A material with a high degree of polarization such as an absorptive type polarizer containing a dichromatic substance is preferably used for forming a liquid-crystal display device so that bright display can be achieved, that is, so that good-contrast-ratio display based on incidence of highly linearly polarized light onto a liquid-crystal cell can be obtained by transmitting light highly linearly polarized by the quarter-wave plate, through the dichromatic polarizer provided in accordance with necessity while absorption loss of the light can be prevented as much as possible. Especially, an absorptive type polarizer containing a dichromatic substance and having light transmittance of not lower than 40% and a degree of polarization of not lower than 95.0%, especially not lower than 99%, is used preferably.

The transparent protective layer is provided for the purpose of protection particularly when a material poor in water resistance such as a polarizing film containing a dichromatic substance is used. The transparent protective layer may be formed by a suitable method such as a method of applying plastics or a method of laminating a film-like material. When the transparent protective layer is formed from a separate material such as a separate film, the separate material may be preferably integrally laminated on the polarizer through adhesive layers in order to prevent reflection loss. The thickness of the transparent protective layer can be determined suitably. The thickness is often selected to be generally not larger than 1 mm, especially not larger than 500 $\mu$m, further especially in a range of from 1 to 300 $\mu$m. Incidentally, a suitable material may be used as the plastics. Generally, any one of materials as listed above in the description of the transparent base material for supporting the liquid-crystal polymer, the retardation layer, etc. may be used as the plastics.

Incidentally, the transparent protective layer can be formed into the form of a surface fine prismatic structure by a method of impregnating the transparent protective layer with fine particles. Suitable transparent particles, for example, with a mean particle size of from 0.5 to 20 $\mu$m may be used as the fine particles. The transparent particles maybe inorganic fine particles or organic fine particles. The inorganic particles may be electrically conductive and may be made of a member selected from the group consisting of silica, alumina, titania, zirconia, tinoxide, indiumoxide, cadmiumoxide, and antimony oxide. The organic particles may be made of a crosslinked or non-crosslinked polymer. The amount of the fine particles is generally in a range of from 2 to 25% by weight, especially in a range of from 5 to 20% by weight.

For arrangement of the dichromatic polarizer 3 on the upper surface of the quarter-wave plate 2 as shown in FIG. 1, the angle of arrangement of the dichromatic polarizer with respect to the quarter-wave plate can be determined suitably in accordance with the retardation characteristic of the quarter-wave plate, the characteristic of circularly polarized light incident thereon, etc. From the point of view of improvement in light-utilizing efficiency, the dichromatic polarizer may be preferably disposed so that the axis of light transmitted through the dichromatic polarizer is as parallel with the direction of polarization (vibration) of light linearly polarized through the quarter-wave plate as possible.

As described above, the optical element is provided in the following manner. Incident light such as natural light from a light source is separated into left- and right-handed circularly polarized light components or linearly polarized light components with axes of polarization crossing each other perpendicularly as a reflected light component and a transmitted light component by the reflective type polarizer, so that the circularly polarized light component transmitted through the reflective type polarizer is linearly polarized through the quarter-wave plate in accordance with necessity with a result of reduction in absorption loss, and the linearly polarized light is then supplied to the dichromatic polarizer. That is, the optical element is provided so that incident light can be utilized efficiently to improve luminance.

In the above description, when transmitted light is viewed obliquely in the condition that the optical element according to the invention is disposed on a planar light source so that the reflective type polarizer is located in an inner side, a variation of hue between two points calculated by the expression: $\sqrt{\{(x2-x1)^2+(y2-y1)^2\}}$ is not larger than 0.06, especially not larger than 0.055 in which x1 and y1 express a hue at a point with a predetermined elevation angle, especially of from 30 to 70 degrees, and any azimuth angle, and x2 and y2 express a hue at another point with the same elevation angle and a changed azimuth angle. The optical element can be used for obtaining a liquid-crystal display device in which hue is changeless in spite of the azimuth angle changed at oblique viewing.

The optical element satisfying the variation in hue can be obtained by a method using a light-diffusing reflective type polarizer. Examples of the method include: a method in which a cholesteric liquid-crystal layer and a quarter-wave plate are laminated on each other through an adhesive layer containing particles and exhibiting light-diffusing characteristic; a method in which a cholesteric liquid-crystal layer or a quarter-wave plate provided with such a light-diffusing adhesive layer is used for forming a reflective type polarizer; and a method in which a cholesteric liquid-crystal layer or a quarter-wave plate containing particles and exhibiting light-diffusing characteristic is used for forming a reflective type polarizer.

The optical element which can be used preferably for forming a liquid-crystal display device little both in luminance unevenness and in display unevenness and exhibiting bright visibility is an optical element using a reflective type polarizer in which variation in transmittance and hue from in-plane averages ranges from 0.5 to 5.0, especially not larger than 4, further especially not larger than 3 in terms of $\Delta E$ given by the Hunter's color difference formula (Unexamined Japanese Patent Publication No. Hei. 11-311710).

Figure 2:
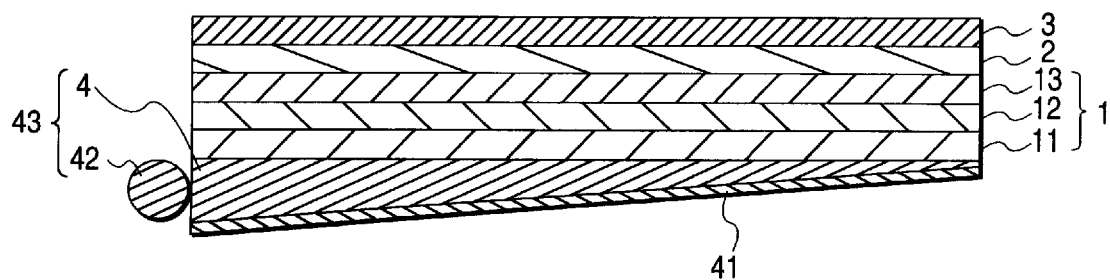
FIG. 2 is a sectional view showing an example of an illuminator.
Figure 3:
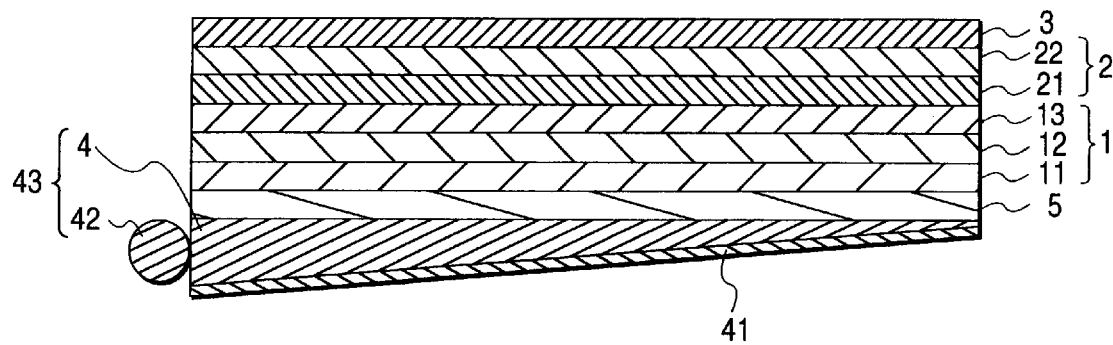
FIG. 3 is a sectional view showing another example of the illuminator.

As shown in FIGS. 2 and 3, the optical element according to the invention can be disposed on a suitable planar light source 43 such as a side light type light pipe or an EL lamp so as to be used preferably for forming an illuminator adapted to a backlight unit for a liquid-crystal display device. Incidentally, the planar light source shown in FIGS. 2 and 3 has a light pipe 4 provided with a reflection layer 41 on its rear surface side, and a light source 42 disposed on a side surface of the light pipe 4. The optical element is disposed on the front surface side (light exit side) of the light pipe 4 so that the reflective type polarizer 1 is located in an inner side.

According to the illuminator shown in FIGS. 2 and 3, light from the light source 42 is made incident on a side surface of the light pipe 4 and reflected from the rear surface of the light pipe 4. The reflected light exits from the front surface of the light pipe 4. The exit light is transmitted as specific circularly polarized light (vertical) or as specific elliptically polarized light (oblique) through the circularly polarized light separating layer 1 disposed on the front surface side of the light pipe 4. The circularly or elliptically polarized light is linearly polarized through the quarter-wave plate 2, so that the linearly polarized light is made incident on the dichromatic polarizer 3. On the other hand, light reflected as the other circularly polarized light component than the specific circularly polarized light from the circularly polarized light separating layer 1 is made incident on the light pipe 4 again and reflected from the reflection layer 41 disposed on the rear surface of the light pipe 4. The reflected light serves as return light which is made incident on the circularly polarized light separating layer 1 again.

The state of polarization of the light reflected from the circularly polarized light separating layer is changed when the light is reflected from the rear surface of the light pipe, so that part or all of the reflected light is transformed into specific circularly polarized light which can be transmitted through the circularly polarized light separating layer. Accordingly, the reflected light component separated by the circularly polarized light separating layer is confined between the circularly polarized light separating layer and the light pipe while reflection is repeated therebetween until the reflected light component is transformed into specific circularly polarized light which can be transmitted through the circularly polarized light separating layer. Hence, in the side light type light pipe, the reflected light component is confined between the circularly polarized light separating layer and the reflection layer on the light pipe while reflection is repeated therebetween. During the period of repetition, the state of polarization of the reflected light component is transformed into a state permitting the light to be transmitted through the circularly polarized light separating layer. As a result, the transformed light component is output together with the initially transmitted light component of incident light. In this manner, unused part of light due to reflection loss is reduced. The same rule can be applied to the case where a linearly polarized light separating layer is used in place of the circularly polarized light separating layer.

On the other hand, circularly polarized light output from the circularly polarized light separating layer 1 is transformed into linearly polarized light or elliptically polarized light containing a large amount of linearly polarized light component through the quarter-wave plate 2. The light obtained by the transformation is little absorbed to but transmitted through the dichromatic polarizer 3 when the direction of linear polarization of the light coincides with the transmission axis of the dichromatic polarizer 3. In this manner, unused part of light due to absorption loss is also reduced. As a result, light part which has been unused as reflection loss or absorption loss in the related art can be utilized effectively to thereby improve light-utilizing efficiency. Accordingly, the side light type light pipe can be preferably used as a planar light source.

Any suitable plate having a reflection layer on its rear surface to output light toward its front surface side can be used as the light pipe. Preferably, a plate capable of outputting light efficiently without any absorption loss is used as the light pipe. An example of the preferred light pipe is a known side light type backlight unit which is incorporated in a liquid-crystal display device and in which a linear light source such as a (cold or hot) cathode tube or a light source such as a light-emitting diode is disposed on a side surface of the light pipe 4 so that light transmitted through the light pipe is made to exit from a surface side of the light pipe by diffusion, reflection, diffraction, and interference. The light pipe which is provided so that light transmitted through the light pipe is made to exit from a surface side of the light pipe can be obtained, for example, as a light pipe having a diffusing material provided on a light exit surface of a transparent or semitransparent resin plate or on a rear surface thereof so as to be shaped like dots or stripes, or as a light pipe having an unevenness structure, especially a fine prism array-like structure given to a rear surface of such a resin plate.

The light pipe which makes light exit from one surface side may have a function of transforming a reflected light component from the circularly polarized light separating layer into polarized light by itself. The provision of the reflection layer 41 on the rear surface of the light pipe can prevent reflection loss approximately perfectly. The reflection layer such as a diffusing reflection layer or a specular reflection layer can be used preferably in the invention because it is excellent in the function of transforming the reflected light component from the circularly polarized light separating layer into polarized light. Incidentally, the diffusing reflection layer represented by a prismatic surface randomizes the state of polarization of the reflected light component by its diffusing function to eliminate the state of polarization. On the other hand, the specular reflection layer represented by a metal surface constituted by a vapor-deposited layer of aluminum or silver, a resin plate provided with the vapor-deposited layer or a sheet of metal foil inverts the state of polarization when polarized light is reflected from the specular reflection layer.

For the formation of the illuminator, as shown in FIG. 3, a prism array layer 5 made of a prism sheet for controlling the direction of exit of light, a diffusing plate for obtaining uniform light emission, a reflection unit for returning leaked light or an auxiliary unit such as a light source holder for guiding light emitted from a linear light source to a side surface of the light pipe may be disposed as one layer or as a suitable combination of two or more layers in a predetermined position, for example, on an upper, lower or side surface of the light pipe 4 as occasion demands.

In the above description, the prism array layer or the diffusing plate disposed on the front surface side (light exit side) of the light pipe or dots given to the light pipe can function as a polarization transforming unit for changing the phase of the reflected light component by the diffusing effect. Incidentally, when two or more prism array layers are to be disposed, the prism array layers are preferably disposed in an optical anisotropy-eliminated state by shifting the angles of arrangement of prism arrays in the respective layers relative to each other, for example, by means of making the prism arrays cross each other perpendicularly or obliquely. The prism array layer is generally located between the reflective type polarizer 1 and the planar light source or its light pipe 4 as shown in FIG. 3.

The optical element used for forming the illuminator is preferably configured so that the value ΔE is in a range of from 0.5 to 9.0, especially not larger than 8, further especially not larger than 7 in order to suppress both luminance unevenness and display unevenness. That is, the use of a reflective type polarizer and a dichromatic polarizer in combination permits the allowable range of ΔE to be widened. The is based on the fact that variation based on ΔE is allowed to become large because elimination of polarization, reflection and inversion occurs in an optical layer such as a reflection plate, a light pipe or a diffusing plate when the illuminator is formed in the manner described above.

In the invention, respective parts such as a reflective type polarizer such as a circularly polarized light separating layer or a linearly polarized light separating layer, a quarter-wave plate, a dichromatic polarizer, and a light pipe, for forming the optical element or the illuminator can be integrally laminated on one another through adhesive layers as occasion demands. The integral lamination of such constituent parts is effective in suppressing reflection loss in each interface and preventing entrance of foreign matter into the interface to thereby prevent deterioration of display quality and in preventing deterioration of compensating efficiency and polarization transforming efficiency caused by positional displacement in an optical system. Accordingly, also when the reflective type polarizer, the quarter-wave plate, the dichromatic polarizer or the light pipe is formed from a plurality of layers, the layers are preferably bonded to one another through adhesive layers so as to be integrated with one another.

Any suitable adhesive agent can be used for the integral lamination. Especially, an adhesive layer excellent in stress relaxing characteristic may be preferably used from the point of view of suppressing stress produced in the circularly polarized light separating layer, the quarter-wave plate or the dichromatic polarizer by heat generated from a light source to thereby prevent the change of the refractive index caused by photo elastic deformation to thereby form a liquid-crystal display device bright and excellent both in reliability of visibility and in display quality. Transparent particles as listed above in the description of the transparent protective layer may be mixed with the adhesive layer so that the adhesive layer is made to have a light-diffusing function. Such a light-diffusing type adhesive agent is favorable for reducing the thickness of the optical element or the illuminator because the adhesive layer can serve also as a light-diffusing layer. Particularly when the light-diffusing type adhesive layer is applied to the optical element, there is also an advantage in that variation in hue is further reduced by the homogenizing effect owing to diffusion of light.

A transparent adhesive agent formed from any suitable polymer such as acrylic polymer, silicone polymer, polyester, polyurethane, polyether or synthetic rubber may be used for forming the adhesive layer. Especially, an acrylic adhesive agent may be preferably used from the point of view of optical transparency, adhesive characteristic, and weather resistance. From the point of view of preventing photoelastic deformation by relaxing internal stress produced in the inside of the laminate by heat, the preferred adhesive layer has a relaxed elastic coefficient in a range of from $2 \times 10^5$ to $1 \times 10^7$ dyn/cm$^2$, especially in a range of from $2 \times 10^6$ to $8 \times 10^6$ dyn/cm$^2$.

The thickness of the adhesive layer may be determined suitably. Generally, the thickness is selected to be in a range of from 1 to 500 μm, especially in a range of from 2 to 200 μm, further especially in a range of from 5 to 100 μm, from the point of view of adhesive force, reduction of thickness, etc. Incidentally, any suitable additive can be mixed with the adhesive layer as occasion demands. Examples of the additive include: tackifiers such as petroleum resin, rosin resin, terpene resin, coumarone-indene resin, phenol resin, xylene resin and alkyd resin; softeners such as phthalic ester, phosphoric ester, paraffin chloride, polybutene and polyisobutylene; and other various kinds of fillers and age resistors.

For example, the integrally laminated optical element can be formed by a method in which: an adhesive layer provided on a separator of a thin sheet such as a film having a surface treated with a releasant is transferred on to an adhesive surface of a circularly polarized light separating layer; a quarter-wave plate is contact-bonded onto the circularly polarized light separating layer through the adhesive layer as occasion demands; and a dichromatic polarizer is disposed and contact-bonded thereon through an adhesive layer. Alternatively, the integrally laminated optical element may be formed by a method in which: an adhesive layer provided on a separator is transferred onto an adhesive surface of a light pipe; a reflective type polarizer is disposed on the light pipe and contact-bonded thereto through the adhesive layer; another adhesive layer is transferred onto the reflective type polarizer; and a dichromatic polarizer is successively contact-bonded to the reflective type polarizer through the adhesive layer. Alternatively, the integrally laminated optical element may be formed by a method in which: adherends such as a reflective type polarizer, a dichromatic polarizer, and a light pipe are laminated on one another in a predetermined sequence through adhesive layers provided on predetermined adhesive surfaces in advance; and the laminate is pressed so that the adherends are contact-bonded to one another collectively.

The optical element or the illuminator according to the invention may contain at least one suitable optical layer such as a light-diffusing plate disposed in a suitable position, for example, on a surface thereof or between layers. In this case, the optical layer may be integrally laminated on the reflective type polarizer through an adhesive layer excellent in stress relaxing characteristic. Such a pre-adhesion method has an advantage in that there can be produced an element stabler in quality and more excellent in reliability than the element produced by the method of successive adhesion in assembling line. Incidentally, parts such as a reflective type polarizer, a quarter-wave plate, a dichromatic polarizer, a light pipe, an adhesive layer and another optical layer for forming the optical element or the illuminator according to the invention maybe formed to have ultra violet absorptive power, for example, by a method of treating the parts with an ultraviolet absorbent such as a salicylic ester compound, a benzophenone compound, a benzotriazole compound, a cyanoacrylate compound or a nickel complex salt compound.

Figure 4:
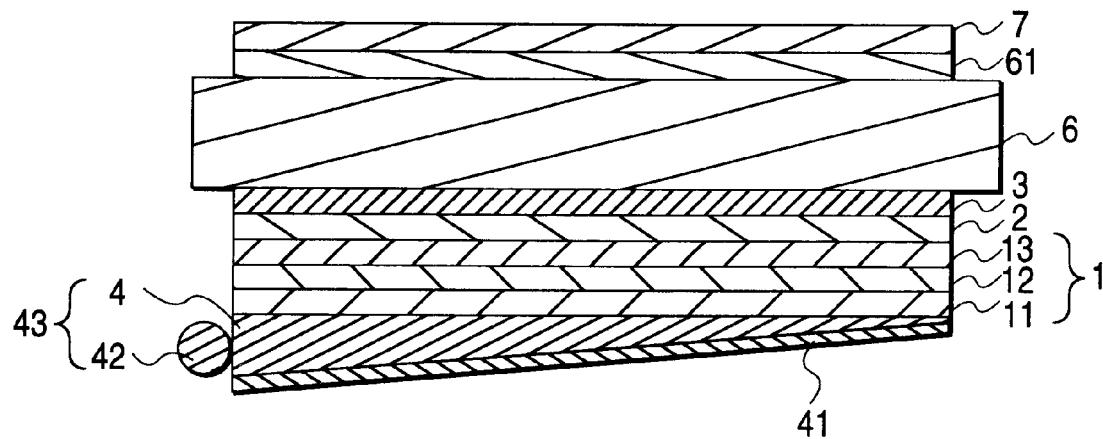
FIG. 4 is a sectional view showing an example of a liquid-crystal display device.
Figure 5:
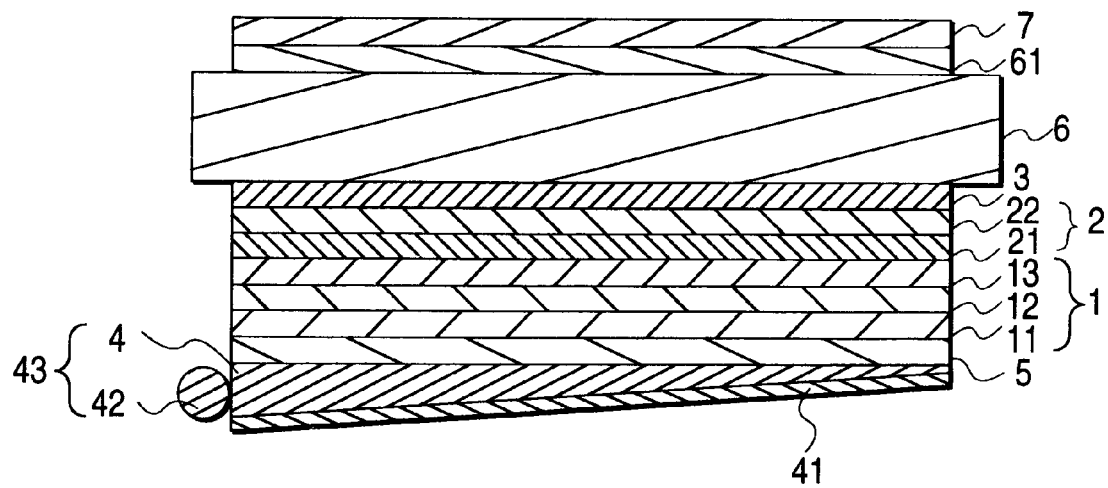
FIG. 5 is a sectional view showing another example of the liquid-crystal display device.

As described above, the illuminator according to the invention can be preferably used in various devices as a backlight system in a liquid-crystal display device because the illuminator is excellent in light-utilizing efficiency to provide light with high luminance and is easy to increase the area thereof. FIGS. 4 and 5 show examples of the liquid-crystal display device using the illuminator as a backlight system. The liquid-crystal display device is configured so that a liquid-crystal cell 6 is disposed on the dichromatic polarizer 3 side as a light exit side of the illuminator. In FIGS. 4 and 5, there are further provided a dichromatic polarizer 61 which functions as a photo detector, and a light-diffusing plate 7 for diffusing light for viewing.

The optical element or the illuminator according to the invention can be particularly preferably used for forming a liquid-crystal display device of the type in which dichromatic polarizers are disposed on opposite surfaces of the liquid-crystal cell so that the dichromatic polarizers function as a polarizing element and a photo detector respectively. On this occasion, the dichromatic polarizer in the optical element or illuminator according to the invention is used on a side in which it functions as a polarizing element. The liquid-crystal display device is generally formed by assembling constituent parts such as a dichromatic polarizer, a liquid-crystal cell, a backlight unit and a compensating phase retarder provided in accordance with necessity and by incorporating a drive circuit in the liquid-crystal display device. In the invention, the liquid-crystal display device can be formed in accordance with the related art without any particular limitation except that the optical element or the illuminator is disposed on the illumination incidence surface on which the illumination light for the liquid-crystal cell is incident as described above. In this case, all or part of the constituent parts may be integrally bonded to one another through adhesive layers such as adhesive layers respectively.

Further, the optical element or the illuminator according to the invention can be preferably adapted to a liquid-crystal cell requiring polarized light to be incident on the liquid-crystal cell, such as a cell using twisted nematic (TN) liquid crystal or super-twisted nematic (STN) liquid crystal. It may be adapted also to a liquid-crystal cell using non-twisted liquid crystal, guest-host liquid crystal or ferroelectric liquid crystal. When the liquid-crystal display device is formed, one suitable optical layer or two or more suitable optical layers such as a light-diffusing plate, an anti-glare layer, an anti-reflection layer, a protective layer and a protective plate provided on the dichromatic polarizer on the photo detector side, and a compensating phase retarder provided between the liquid-crystal cell and the dichromatic polarizer can be disposed suitably.

Accordingly, an optical layer made of a laminate of a plurality of polymer thin films (Unexamined Japanese Patent Publication No. Hei. 4-268505 and WO 95/17691) may be generally disposed between the backlight unit and the liquid-crystal cell so as to improve luminance. The compensating phase retarder compensates for wavelength dependence of birefringence so as to improve visibility. In the invention, one or two compensating phase retarders may be disposed between the photo detector side dichromatic polarizer and the liquid-crystal cell or/and between the polarizing element side dichromatic polarizer and the liquid-crystal cell as occasion demands. Incidentally, any suitable plate can be used as the compensating phase retarder in accordance with the wavelength range. The compensating phase retarder may be formed as one retardation layer or as a superposed layer of two or more retardation layers. The compensating phase retarder can be obtained as a drawn film, a liquid-crystal polymer layer, or the like, as listed above in the description of the quarter-wave plate.

EXAMPLE 1

A tetrahydrofuran solution containing 20% by weight of an acrylic thermotropic cholesteric liquid-crystal polymer was applied on a polyvinyl alcohol-rubbing surface (about 0.1 μm thick) of a triacetyl cellulose film 50 μm thick by a wire bar. After heated at 160±2° C. for 5 minutes to be oriented, the polymer was left at room temperature to be cooled. In such a manner, two kinds of circularly polarized light separating layers each 5 μm thick were formed so as to be capable of transmitting left-handed circularly polarized light with selective reflection wavelength ranges of from 400 to 470 nm and of from 600 to 700 nm on the basis of the difference in mesogen ratio. Then, the liquid-crystal layers of the circularly polarized light separating layers were laminated and hot-pressed on each other at 130° C. through laminating rolls. Thus, a circularly polarized light separating plate with a selective reflection wavelength range of from 400 to 700 nm was obtained.

Then, a quarter-wave plate made of a drawn film of polycarbonate and having a frontal retardation of 120±5 nm and Nz of −1.5 was bonded to a larger helical pitch side of the circularly polarized light separating plate through an acrylic adhesive layer 20 μm thick. Thus, a reflective type polarizer was obtained. Then, an absorptive type polarizer was bonded to the quarter-wave plate side of the reflective type polarizer through an acrylic adhesive layer 20 μm thick so that the axis of polarization of light transmitted through the absorptive type polarizer was coincident with the axis of polarization of light transmitted through the reflective type polarizer. Thus, an optical element was obtained.

EXAMPLE 2

An optical element was obtained in the same manner as in Example 1 except that the circularly polarized light separating plate and the quarter-wave plate were bonded to each other through a light-diffusing type acrylic adhesive layer mixed with silica.

COMPARATIVE EXAMPLE

An optical element was obtained in the same manner as in Example 1 except that the quarter-wave plate was replaced by a quarter-wave plate having a frontal retardation of 120±5 nm and Nz of 1.

Evaluation Test

The optical element obtained in each of Examples 1 and 2 and Comparative Example was disposed on the light source so that the reflective type polarizer in the optical element was located in an inner side. Hues x, y of light transmitted through the absorptive type polarizer were measured at three points, that is, a point of frontal viewing (an elevation angle of 0° and an azimuth angle of 0°), a point at an elevation angle of 70° and at an azimuth angle of 0° and a point at an elevation angle of 70° and at an azimuth angle of 45°. The variation of hue at each of the points was calculated on the basis of the expression: $\sqrt{\{(x2-x1)^2+(y2-y1)^2\}}$.

Results of the evaluation were as shown in the following Table.

|  | Elevation Angle | Azimuth Angle | x | Y | Variation of Hue Difference from Frontal Viewing | Variation of Hue Difference based on Azimuth Angle |
|---|---|---|---|---|---|---|
| Example 1 | 0° | 0° | 0.312 | 0.331 | — | — |
|  | 70° | 0° | 0.344 | 0.356 | 0.041 | — |
|  | 70° | 45° | 0.342 | 0.305 | 0.040 | 0.051 |
| Example 2 | 0° | 0° | 0.307 | 0.332 | — | — |
|  | 70° | 0° | 0.343 | 0.338 | 0.036 | — |
|  | 70° | 45° | 0.331 | 0.300 | 0.040 | 0.040 |
| Comparative Example | 0° | 0° | 0.305 | 0.330 | — | — |
|  | 70° | 0° | 0.334 | 0.355 | 0.038 | — |
|  | 70° | 45° | 0.276 | 0.302 | 0.040 | 0.079 |

This invention should not be limited to the embodiments described above. Various modifications can be included in this invention within a range which can be easily realized by those skilled in the art without departing from the spirit of the scope of claim.

What is claimed is:

1. An optical element comprising:
   a laminate including a reflective type polarizer for separating incident light into polarized light components through reflection and transmission, and a dichromatic polarizer laminated on said reflective type polarizer;
   wherein a variation of hue between two points calculated by an expression: $\sqrt{\{(x2-x1)^2+(y2-y1)^2\}}$ is not larger than 0.06 when x1 and y1 express a hue at a point with a predetermined elevation angle and any azimuth angle, and x2 and y2 express a hue at another point with the same elevation angle and a changed azimuth angle in a case where transmitted light is obliquely viewed in a condition that said laminate is disposed on a planar light source so that said reflective type polarizer is located in an inner side.

2. An optical element according to claim 1, wherein said elevation angle is in a range of from 30 to 70 degrees.

3. An optical element according to claim 1, wherein said reflective type polarizer contains a cholesteric liquid-crystal layer.

4. An optical element according to claim 1, wherein at least a part of constituent layers in said optical element adhere to one another through adhesive layers.

5. An optical element according to claim 1, wherein said reflective type polarizer contains a combination of a cholesteric liquid-crystal layer and a quarter-wave plate.

6. An optical element according to claim 1, wherein said reflective type polarizer contains a reflective type polarizer which is capable of transmitting a linearly polarized light component with a predetermined axis of polarization and reflecting the other light component.

7. An illuminator comprising a planar light source including a reflection layer on its rear surface side, and an optical element according to claim 1 and disposed on the front surface side of said planar light source so that the reflective type polarizer of said optical element is located in an inner side.

8. An illuminator according to claim 7, further comprising at least one prism array layer disposed between said reflective type polarizer and said planar light source, wherein, when said at least one prism array layer is formed by at least two prism array layers, directions of arrangement of arrays in adjacent upper and lower layers among said at least two prism array layers cross each other.

9. An illuminator according to claim 7, wherein at least a part of constituent layers in said illuminator adhere to one another through adhesive layers.

10. An illuminator according to claim 7, wherein said elevation angle is in a range of from 30 to 70 degrees.

11. An illuminator according to claim 7, wherein said reflective type polarizer contains a cholesteric liquid-crystal layer.

12. An illuminator according to claim 7, wherein said reflective type polarizer contains a combination of a cholesteric liquid-crystal layer and a quarter-wave plate.

13. An illuminator according to claim 7, wherein said reflective type polarizer contains a reflective type polarizer which is capable of transmitting a linearly polarized light component with a predetermined axis of polarization and reflecting the other light component.

14. A liquid-crystal display device comprising an illuminator according to claim 7, and a liquid-crystal cell disposed on a light exit side of said illuminator.

15. A liquid-crystal display device according to claim 14, wherein at least a part of constituent layers in said liquid-crystal display device adhere to one another through adhesive layers.

16. A liquid-crystal display device according to claim 14, wherein said elevation angle is in a range of from 30 to 70 degrees.

17. A liquid-crystal display device according to claim 14, wherein said reflective type polarizer contains a cholesteric liquid-crystal layer.

18. A liquid-crystal display device according to claim 14, wherein said reflective type polarizer contains a combination of a cholesteric liquid-crystal layer and a quarter-wave plate.

19. A liquid-crystal display device according to claim 14, wherein said reflective type polarizer contains a reflective type polarizer which is capable of transmitting a linearly polarized light component with a predetermined axis of polarization and reflecting the other light component.

* * * * *